March 11, 1947.  C. W. CRUMRINE  2,417,240
ROLL HOLDING CAMERA
Filed Jan. 22, 1944                5 Sheets-Sheet 2
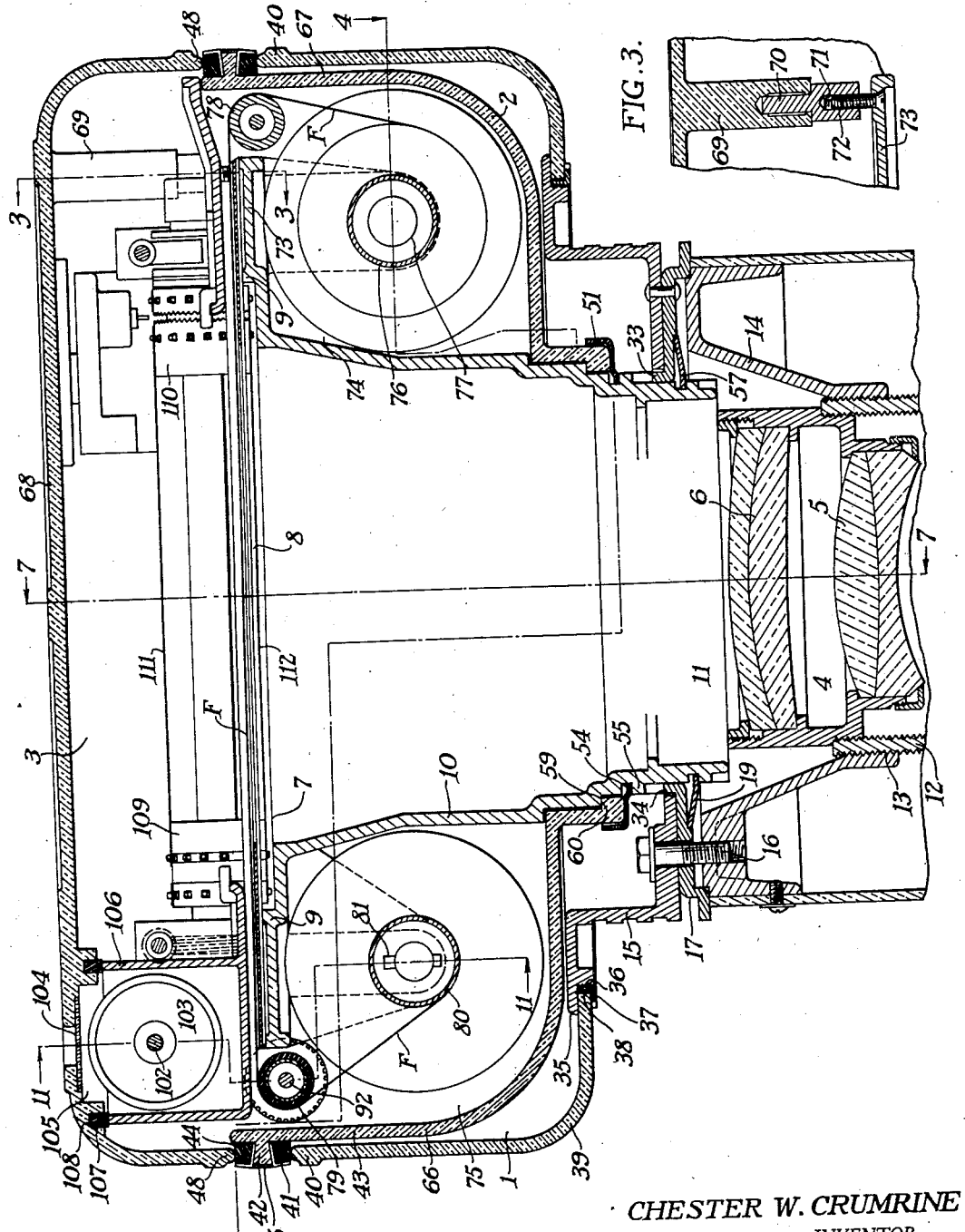
CHESTER W. CRUMRINE
INVENTOR

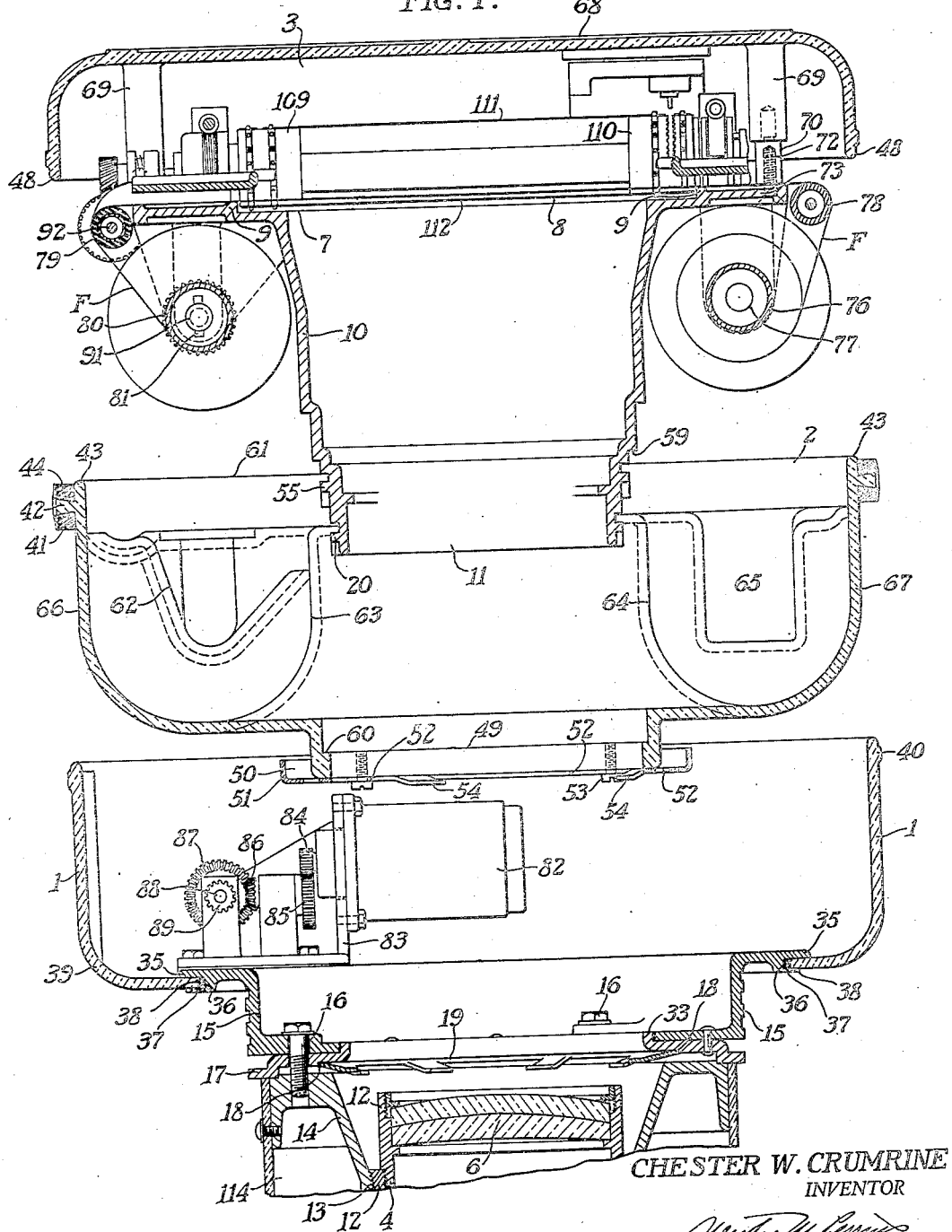

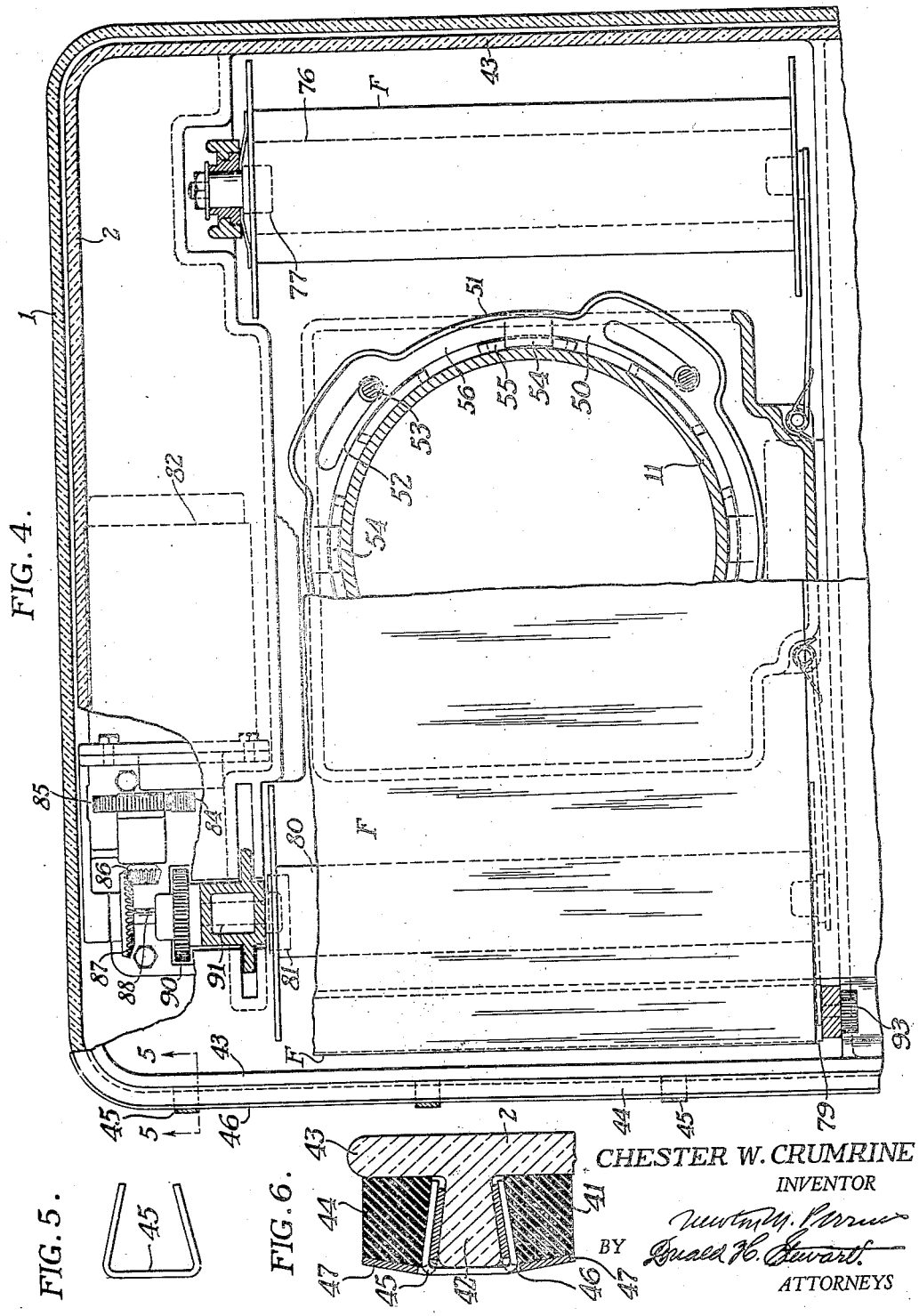

March 11, 1947.  C. W. CRUMRINE  2,417,240
ROLL HOLDING CAMERA
Filed Jan. 22, 1944  5 Sheets-Sheet 4
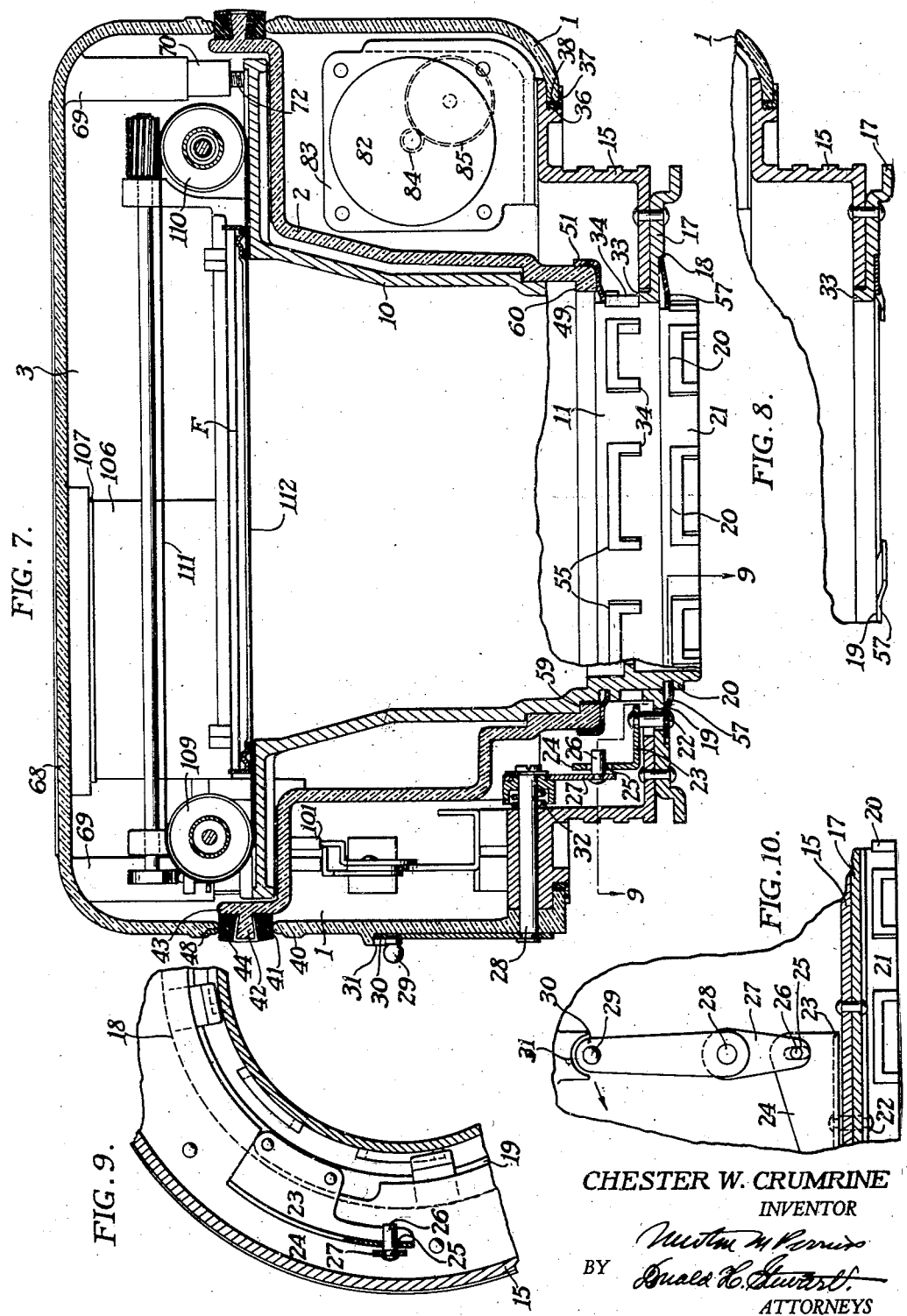
CHESTER W. CRUMRINE
INVENTOR
BY
ATTORNEYS March 11, 1947. C. W. CRUMRINE 2,417,240
ROLL HOLDING CAMERA
Filed Jan. 22, 1944 5 Sheets-Sheet 5
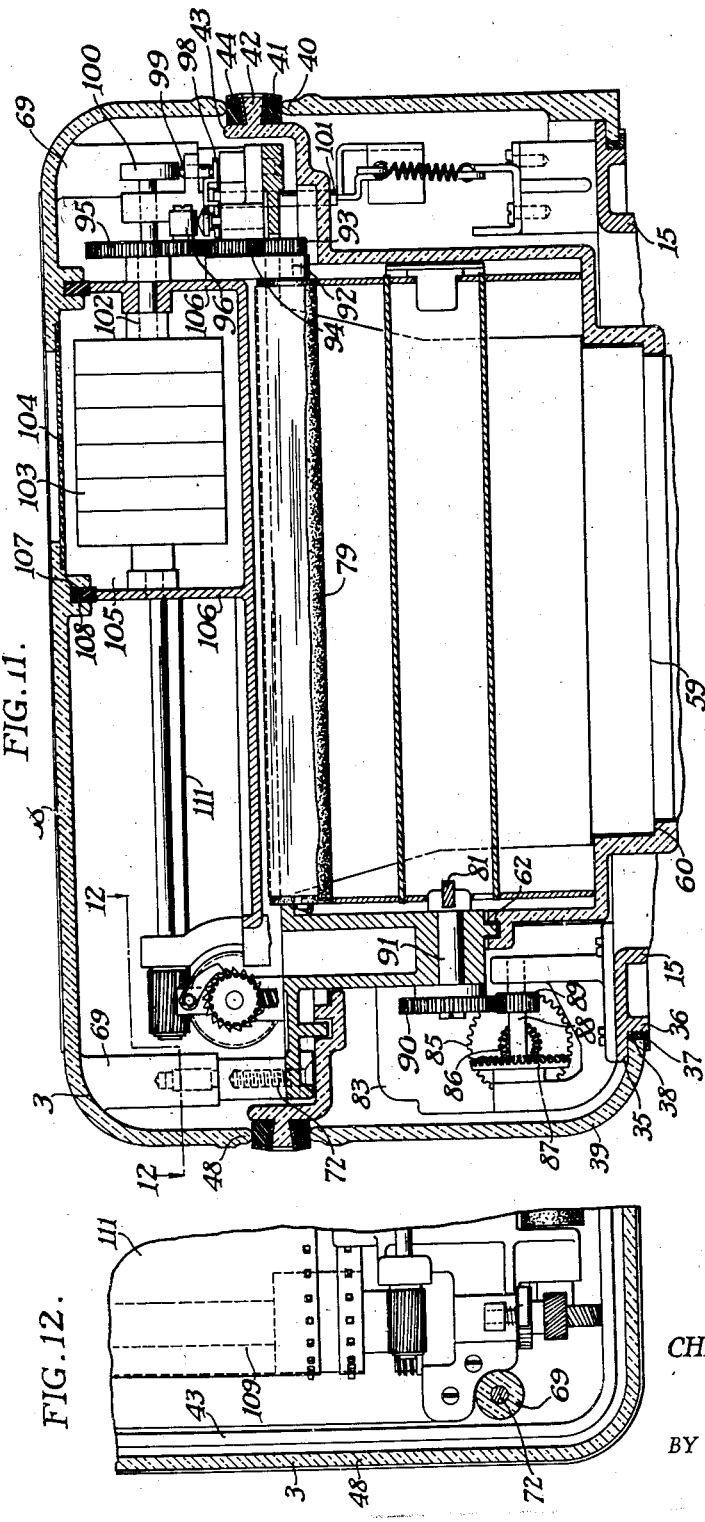
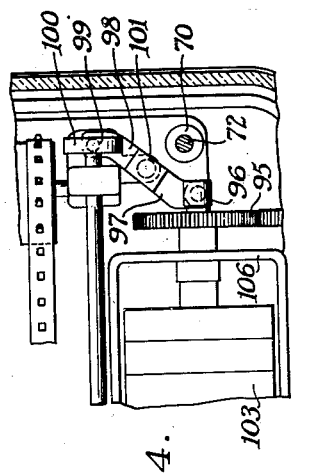
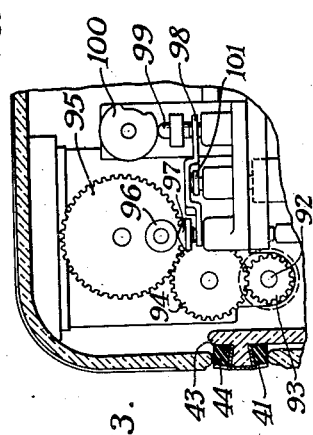
CHESTER W. CRUMRINE
INVENTOR
BY
ATTORNEYS Patented Mar. 11, 1947

2,417,240

UNITED STATES PATENT OFFICE 2,417,240

ROLL HOLDING CAMERA

Chester W. Crumrine, Rochester, N. Y., assignor to Eastman Kodak Company, Rochester, N. Y., a corporation of New Jersey Application January 22, 1944, Serial No. 519,308

4 Claims. (Cl. 95—31)

This invention relates to photography and more particularly to the construction of photographic cameras. One object of my invention is to provide a camera which is of comparatively light weight with respect to its size. Another object of my invention is to provide a camera of a construction such that the critical parts of the camera, including the camera objective and the focal plane of the camera, can be held to a high degree of accuracy, while at the same time the remaining parts of the camera can be made inexpensively. Another object of my invention is to provide a camera construction particularly adapted for use in aviation cameras. A further object of my invention is to provide a camera in which parts of the camera mechanism may be carried by parts of the camera body in such a manner that they will cooperate with the parts of the camera which are held to extremely precise dimensions. A still further object of my invention is to provide a photographic camera of a number of separable parts, one part of which may include a light-tight casing or magazine for the film and another part of which may support the camera objective, the magazine part including separable sections which can be opened for loading and unloading the film. A still further object of my invention is to provide a camera construction in which the separable parts may be latched together by a suitable latching means carried by telescopic tubes. Another object of my invention is to provide a simple form of latch mechanism for holding the separable parts together and to provide a latching mechanism in which the operation of the latches must take place in a predetermined order. A still further object of my invention is to provide a photographic camera in which the light-tight casing may be made relatively inexpensively and in which it is unnecessary to make the casing with a high degree of accuracy. Other objects will appear from the following specification, the novel features being particularly pointed out in the claims at the end thereof.

It is well known that photographic cameras can only produce the best photographic results where the film is held with a high degree of precision at the focal plane of an objective and that the plane of the film should be exactly at right angles to the axis of the objective. It is of course also necessary to hold the camera objective with extreme accuracy and it has ordinarily been a difficult and expensive proposition to manufacture the parts necessary to hold the film and objective precisely in the proper positions and at the same time to provide the necessary light-tight enclosure for the sensitive material without producing an extremely expensive camera as a whole. This has been particularly true for cameras to be used in airplanes because such cameras are frequently of relatively large size and it is desirable to reduce the weight of such cameras as far as possible for obvious reasons.

My improved camera structure is particularly adapted to overcome some of the usual difficulties in providing an extremely light weight camera in which the film and objective are carried with precision and in which the camera body does not require anything like the same degree of precision and can be made of relatively inexpensive materials.

Coming now to the drawings wherein like reference characters denote like parts throughout:

Fig. 1 is a vertical section through a camera constructed in accordance with and embodying a preferred form of my invention with the three major parts thereof in a partially separated position to better show their relationship before assembling;

Fig. 2 is a longitudinal section with parts broken away showing the camera parts of Fig. 1 assembled into a picture taking position;

Fig. 3 is a fragmentary detail section taken on line 3—3 of Fig. 2;

Fig. 4 is a top plan view partially broken away and partially in section taken on line 4—4 of Fig. 2 and showing the lower portion of the camera;

Fig. 5 is a plan view of a gasket holding clip;

Fig. 6 is a fragmentary detail section through a preferred form of double gasket construction which may be used on my camera;

Fig. 7 is a sectional view through the magazine part of my camera, the parts of the magazine being in their operative or light-tight position;

Fig. 8 is a fragmentary detail section showing a portion of the objective holding telescoping tube;

Fig. 9 is a fragmentary sectional view taken on line 9—9 of Fig. 7 and illustrating a portion of a bayonet latch locking device;

Fig. 10 is a fragmentary view partially in section showing a locking lever;

Fig. 11 is a fragmentary sectional view showing the film supporting and a portion of the film driving mechanism;

Fig. 12 is a top plan partially in section on line 12—12 of Fig. 11;

Fig. 13 is a fragmentary detail section showing a portion of the shutter control and film drive mechanism; and Fig. 14 is a fragmentary detail showing in part elevation the mechanism partially shown in Fig. 13.

My invention comprises broadly a camera in which the parts which must be made with a high degree of precision can be made of rigid material such as metal and the parts which do not require high precision may be made of a lighter or less expensive material such as of any suitable moldable composition. My camera has been so constructed that the precision parts are reduced to a minimum and so that parts which do not require the same degree of precision may be mounted in the camera body and enclosed by a light-tight covering. This light-tight covering or casing can vary quite materially from the most desirable accurate dimensions without in any way lessening the accuracy of the precision parts and consequently the photographic quality of negatives made with the camera.

More specifically, in the present embodiment of my invention, the camera may be made of a number of parts as indicated in Fig. 1. In this view the camera is shown to consist of three major parts, the lowermost part designated broadly as 1, consisting of what I call the camera body and the parts designated broadly as 2 and 3 comprising parts which, when completely assembled, will constitute a light-tight film magazine. The camera assembled from these parts as shown in Fig. 2 is equipped with the usual objective 4 which may be built up of a series of different lens elements of which only the elements 5 and 6 are illustrated. This objective is accurately aligned with an exposure frame 7, this exposure frame having accurately milled longitudinal rails 8 and including accurately milled transverse rails 9 against which a film F may be pressed for exposure.

Since the parts of the camera which must be most accurately carried are the objective and the exposure frame, I have provided a generally cone-shaped member 10 which can be made with a high degree of precision and (as shown in Fig. 1) this cone-shaped member may terminate in a tubular portion 11 which serves as a means for accurately locating the objective 4 when the camera parts are assembled and as a means for supporting the magazine section 2.

The objective 4 may be accurately assembled on the telescoping tube 11 in the following manner. Referring to Fig. 2, the objective 4 is shown as having a lens barrel 12, having a threaded connection at 13 with the accurately formed metal annular member 14. As shown in Fig. 1 the annular member 14 is attached to a ring 15 by means of bolts 16, there being an annular member 17 bolted between these parts, this annular member having a shoulder 18 on which a locking ring 19 (Fig. 7) may turn. This locking ring preferably has eight lugs, each of which is adapted to engage a corresponding lug 20 on the outside of the telescoping tubular member 11. The space 21 between the lugs 20 permits the ring to unlock when this ring is turned a fraction of a turn by means of the structure shown in Figs. 7 to 10 inclusive. The ring 19 is connected by pins 22 to a flange 23 carrying an upstanding arm 24 including a slot 25 engaged by a pin 26 carried by a lever 27. This lever is attached to turn with a shaft 28 when the handle 29 on the outside of the camera body is moved, this movement occurring only when an operator draws out on the handle 29 releasing the end portion 30 thereof from a formed notch 31 in the wall of the camera which serves as a latch. The handle 29 can be drawn out by drawing out the shaft 28 against the pressure of a spring 32, so that when the handle 29 is returned to its operative latching position of Fig. 10, the curved portion 30 will snap into the curved seat 31, holding the parts in their locked relationship shown in Fig. 7.

Fig. 7 shows not only the camera magazine sections, 2 and 3, but also the camera body section 1, although in this view the camera objective is not shown. It will be noticed that the camera objective 4 is, therefore, as best shown in Fig. 2, definitely located by the tubular member 11 which as above explained is accurately formed so that the objective may be held rigidly in a fixed position determined by the flange 33 of the ring 17 engaging the accurately located stops 34 formed on the tubular member 11.

Also referring to Fig. 2, the camera body 1 is supported by means of the member 15 through an outstanding flange 35 which extends completely around the ring 15 and which has a threaded connection at 36 with a locking ring 37. The periphery 38 of the molded portion 39 of the camera body is connected by this ring and the camera body terminates in a generally rectangular upstanding flange 40 which abuts against the camera body gasket 41.

Referring to Figs. 5 and 6, the camera body gasket 41 is carried by the lower magazine section 2 in the following manner. An undercut or dovetail-shaped flange 42 is formed outwardly from the generally rectangular-shaped magazine wall 43 and the camera gasket 41 is attached to one side of this flange and a similar magazine gasket 44 is attached to the other side of the flange by means of U-shaped spring metal clips 45 as shown in Fig. 5. These clips pass through apertures 46 in the U-shaped metal bands 47 to which the gaskets 41 and 44 are attached so that the gaskets can be held in the position shown in Fig. 6. These gaskets are preferably made of rubber Neoprene or other suitable resilient light-tight material so that the edges of the camera parts contacting with these gaskets may have considerable latitude in shape and dimensions and still produce a satisfactory light-tight seal.

The upper gasket or magazine gasket 44 is contacted by the upper magazine section 3, the generally rectangular lower edge 48 thereof forming a continuous light-tight joint as indicated in Fig. 2.

The gaskets 41 and 44 are carried by the generally rectangular wall 43 of the lower magazine section 2 which will now be described. As indicated in Fig. 1, magazine section 2 is provided with a telescoping tubular portion 49 which is of a size and shape to telescope a portion of the tubular wall 11 of magazine section 3. There is a second bayonet latch for holding the magazine sections together which differs from the latch holding the magazine to the camera body operated by the handle 29 in that the second latch is totally inside the camera and can only be operated after the first latch has been operated to release the magazine from the camera. Referring to Figs. 1 and 2, the magazine latch may consist of an annular member 50 which may be knurled at 51 and which is mounted by means of slots 52 in the annular member engaging studs 53 in such a manner that lugs 54 may be caused to engage and release cooperating projections 55 best illustrated in Fig. 7 and Fig. 4. As shown in Fig. 4, when the ring 50 is turned the lugs 54 and projections 55 may be engaged or released. This view shows four locking lugs but any desired number can be employed. It might also be noticed that the locking ring 50 and the locking ring 19 are both shown as having a downwardly formed center portion 56 in ring 50 and 57 in ring 19. These two rings are preferably made of a relatively stiff metal, but it is usually desirable to have some slight resilience or spring in the metal so that the camera parts may be closely and accurately engaged. The lower magazine section 2 is located by the annular shoulder 59 on the telescoping tube 11, the lower magazine section having a complementary-shaped shoulder 60 as shown in Fig. 7 which is intimately engaged therewith. The lower magazine section 2 has an outer wall which extends upwardly to the periphery or flange 43 as indicated in Fig. 7 and, as indicated in Fig. 1, which shows a transverse section or a section at right angles to that shown in Fig. 7, the wall 61 is provided with a configuration 62, 63, 64 and 65 so shaped as to provide, when completely assembled, light-tight spool chambers when taken in conjunction with the opposite wall of the magazine and with the end walls 66 and 67. Thus it will be seen that the upper magazine section 3 is assembled to the lower magazine section 2 by means of the bayonet latch 50 and that this latch can only be operated when the magazine has been first disassembled from the camera body portion 1 which, in turn, can be released through the operation of the handle 29 which moves the bayonet latch ring 19.

The top magazine section 3 may consist of a molded cover member 68 which need not be made with a high degree of accuracy. This cover member has downwardly extending posts 69 at the four corners shown in section in Fig. 3. Each of these posts is provided with a shaft 70, having a threaded opening 71 for supporting a screw 72, this screw passing through a plate 73 which extends around and forms a part of the main camera supporting member 10 which also is integral with the telescoping tube 11. Thus the cover member 68 of the upper magazine section 3 is supported by the main camera support 10 and the lower edge 48 thereof fits against the magazine gasket 44 as described above.

In the present instance, a supply spool chamber 74 lies on one side of the main camera support 10 and a take-up spool chamber 75 lies on the opposite side thereof, the film F being drawn from a film spool core 76 supported by spool carrying pin 77 and being led over a guide roll 78, thence across the exposure frame and over a rubber covered roller 79 to the hub 80 of a take-up spool mounted on a winding key 81 and a known type of spool support.

A power drive is provided for the film, this power drive consisting of a motor 82 shown in Fig. 1 as being supported by a bracket 83 carried by the annular member 15. This motor includes a pinion 84 operating a suitable gear reduction 85 which drives the beveled gear 86 meshing with a second beveled gear 87 turning the shaft 88 and the pinion 89. This pinion is so positioned that, (Fig. 11) when the camera and magazine sections are assembled, the pinion 89 will mesh with a gear 90 which turns a shaft 91 carrying the take-up film spool winding key 81 mentioned above. When a circuit is made through the motor 82 the take-up film spool will be moved and in moving the film F, having frictional engagement with the rubber covered roller 79, will turn this roller so that its shaft 92 will turn the shaft operating mechanism (best shown in Figs. 11–14) which will wind a focal plane shutter and operate a counter mechanism. The structure of this focal plane shutter and counter mechanism are the subject matter of my application, Serial No. 516,921, for Focal plane shutter, filed January 4, 1944, and need not be described in detail in the present application because the structure of this mechanism, per se, forms no part of the present invention. However, so that the structure can be understood, it may be pointed out that the shaft 92 carries a pinion 93 meshing with gear 94, this gear turning a gear 95 which may be considered a cam since it carries a pin 96 adapted to operate one arm 97 of a toggle 98, the other arm of which 99 may be operated by means of a cam 100. The toggle arm 98 engages a switch member 101 which is operated when either end of the arm 98 moves upwardly, the circuit being broken when either end of the arm moves downwardly. The parts in Fig. 13 are shown in their normal position of rest.

The gear 95 is connected to a shaft 102 (Fig. 11) which may operate a known type of counter 103 which lies beneath a window 104 in a light-tight compartment 105, and in this instance the compartment consists of four upwardly extending walls 106, the upper edges of which abut a gasket 107 provided in a slot 108 between a pair of flanges which may be made integral with the camera top wall 69.

As indicated in my copending application, my shutter is shown as consisting of a pair of curtain members, each curtain including tapes attached to the curtain so that each curtain and its tapes are looped about a pair of spaced supporting spools and rollers 109 and 110, (as shown in Fig. 7) the curtains 111 and 112 and their tapes being only diagrammatically shown. As indicated in Fig. 7, the film F passes through the looped curtains and between the rollers 109 and 110.

It should be noticed that I have mounted all of the camera parts which need to be accurately made for the best photographic results on the member 10, its telescoping tube 11, and its outwardly extending upper flange 73, and by so doing this member which can be readily made with a high degree of precision insures the desired accuracy. On the other hand, other parts of the camera which need not be so accurately carried, such as the outer walls of the upper and lower magazine section and the tubular casing 114 extending around the objective 4 may all be made of any light weight convenient material, such as thermoplastic material, because even if these parts do have some degree of inaccuracy, which almost always results from warping or the like, the camera itself will not be effected unless the inaccuracies are so great as to prevent light-tight connections with the more rigid and highly accurate metal parts of the camera. By providing considerable latitude in the places where these parts go together and by providing gasket connections of the type above described, I have had but little difficulty in producing light-tight casings at comparatively low expense while at the same time the precision of the instrument has been maintained by accurately forming the major camera supporting portion 10 and its associated parts.

In addition, I have provided a structure in which the several sections can be readily and quickly separated and assembled without destroying the accurate relationship of the camera parts and, in addition, I provide a relatively foolproof latch for the magazine sections and one which can only be operated after the magazine has been removed from the camera proper, thus eliminating the accidental exposure of film in the magazine when the camera is assembled.

It is obvious that various modifications from the preferred embodiment of my invention shown in the drawings can readily be made, and I consider as within the scope of my invention all such forms as may come within the scope of the appended claims.

I claim:

1. A roll holding camera comprising, in combination, a tubular supporting member, a two-part film magazine, one of said parts being formed with an exposure aperture positioned within said supporting member, means for detachably connecting said parts to said supporting member, a hollow camera body carrying an objective and adapted to receive the other part of said magazine, means for detachably connecting said body to said supporting member with said objective in optical alignment with and spaced from said aperture, means carried by said other part and engageable by said one part and said body to provide a light-tight connection therebetween, and means on said supporting member engageable by said parts and said body for retaining the camera parts in proper spaced relation.

2. A roll holding camera comprising, in combination, a two-part film magazine, one of said parts being formed with an exposure aperture, a tubular supporting member, means for connecting one end of said member to one of said parts with the aperture positioned within said one end, the other part of said magazine telescoping over said member and cooperating with said one part to provide a light-tight magazine, means on said member for positioning said other part thereon, means for detachably connecting said other part to said member, a hollow camera body carrying an objective and adapted to receive said other part and to telescope over the other end of said supporting member, means for detachably connecting said body to said other end of said member, and means for positioning said body on said other end with said objective in proper spaced relation to said aperture.

3. A roll holding camera comprising, in combination, a two-part film magazine, one of said parts being formed with an exposure aperture, a camera body formed with an objective, a tubular supporting member, means for connecting said one part to one end of said member with said aperture positioned within said member, means for detachably connecting said body in telescoping relation to the opposite end of said member with said objective in optical alignment with said aperture, means on said opposite end of said member for locating said body thereon to position said objective relative to said aperture, means on said member for positioning the other part of said magazine thereon intermediate said body and said one part, means for detachably connecting said other part to said member, and means carried by said other member and engaged by said one part and said body to provide a light-tight connection therebetween.

4. A roll holding camera comprising, in combination, a two-part film magazine, one of said parts being formed with an exposure aperture, a camera body carrying an objective, a tubular supporting member, means for connecting one end of said member to said one part with said aperture positioned in alignment with the opening of said member, said member extending in telescoping relation through the other part of said magazine and into said body, a shoulder formed on said member and adapted to engage a complementary section on said other part to accurately position the latter on said member relative to said one part, means for detachably connecting said other part to said supporting member intermediate said body and said one part, cooperating members on said body and the opposite end of said supporting member to accurately position said body on said supporting member to space said objective the proper distance from said aperture and in alignment therewith, means for detachably connecting said body to said opposite end, said one part and said body having aligned walls the ends of which are adjacent but slightly spaced, a wall member on said other part having a portion extending between the spaced ends of said body and said other part, and a gasket carried by said portion and engageable by said spaced ends to form a light-tight connection between said magazine parts and said body.

CHESTER W. CRUMRINE.

REFERENCES CITED

The following references are of record in the file of this patent:

UNITED STATES PATENTS

| Number | Name | Date |
|---|---|---|
| 2,283,788 | Briechle et al. | May 19, 1942 |
| 1,191,066 | Cramer | July 11, 1916 |
| 2,208,797 | Kende | July 23, 1940 |
| 2,343,257 | Hineline | Mar. 7, 1944 |
| 2,260,991 | Gorey | Oct. 28, 1941 |
| 1,720,224 | Lessler et al. | July 9, 1929 |
| 1,612,860 | Fairchild | Jan. 4, 1927 |
| 2,340,624 | Simmon | Feb. 1, 1944 |
| 2,002,076 | Bornmann et al. | May 21, 1935 |
| 2,036,326 | Frost | Apr. 7, 1936 |

FOREIGN PATENTS

| Number | Country | Date |
|---|---|---|
| 334,637 | British | Apr. 9, 1930 |
| 384,380 | British | June 16, 1932 |